(12) United States Patent
Hinkle et al.

(10) Patent No.: US 12,155,895 B1
(45) Date of Patent: Nov. 26, 2024

(54) ASYNCHRONOUS VIDEO REPOSITORIES WITH THREADED DISCUSSIONS AND AFFINITY GROUPS

(71) Applicant: mmhmm inc., Bentonville, AR (US)

(72) Inventors: Christopher Winson Hinkle, Oakland, CA (US); Phil Libin, Bentonville, AR (US); Leonid Kitainik, San Jose, CA (US)

(73) Assignee: mmhmm inc., Bentonville, AR (US)

( * ) Notice: Subject to any disclaimer, the term of this patent is extended or adjusted under 35 U.S.C. 154(b) by 0 days.

(21) Appl. No.: 18/118,302

(22) Filed: Mar. 7, 2023

Related U.S. Application Data

(60) Provisional application No. 63/317,574, filed on Mar. 8, 2022.

(51) Int. Cl.
*H04N 21/442* (2011.01)
*H04N 21/4788* (2011.01)

(52) U.S. Cl.
CPC ... *H04N 21/44218* (2013.01); *H04N 21/4788* (2013.01)

(58) Field of Classification Search
CPC .............. H04N 21/44218; H04N 21/4788
See application file for complete search history.

(56) References Cited

U.S. PATENT DOCUMENTS

| | | | |
|---|---|---|---|
| 2009/0083260 A1* | 3/2009 | Artom .................... | G06F 16/78 707/999.005 |
| 2013/0268973 A1* | 10/2013 | Archibong ............. | G06Q 50/01 709/204 |
| 2018/0077440 A1* | 3/2018 | Wadhera ............ | H04N 21/8456 |
| 2018/0183886 A1* | 6/2018 | Newell ................... | H04L 65/80 |
| 2022/0115042 A1* | 4/2022 | Zukerman ............. | G06V 10/95 |

* cited by examiner

*Primary Examiner* — Sumaiya A Chowdhury
(74) *Attorney, Agent, or Firm* — Muirhead and Saturnelli, LLC

(57) ABSTRACT

A particular user selectively searches a video repository by measuring physiological parameters of a plurality of users of the video repository while the users watch at least some of the videos of the video repository, determining attraction values of the users to the at least some of the videos based, at least in part, on the physiological parameters, forming groups of the users by maximizing an aggregate of attraction values to a subset of videos of the video repository that have been watched by at least one member of each of the groups, and searching only the subset of videos of the video repository that have been watched by at least one member of a particular group that corresponds to the particular user. The physiological parameters may include heart rate, eye movement, gaze direction, and/or facial expressions. The heart rate may be measured using wearable technology.

19 Claims, 14 Drawing Sheets

FIG. 5. Threaded video discussion

ASYNCHRONOUS VIDEO REPOSITORIES WITH THREADED DISCUSSIONS AND AFFINITY GROUPS

CROSS-REFERENCE TO RELATED APPLICATIONS

This application claims priority to U.S. Prov. App. No. 63/317,574, filed on Mar. 8, 2022, and entitled "ASYNCHRONOUS VIDEO REPOSITORIES WITH THREADED DISCUSSIONS AND AFFINITY GROUPS", which is incorporated herein by reference.

TECHNICAL FIELD

This application is directed to the field of information processing, video recording, storage, and viewing, and more specifically to building and using asynchronous video repositories with threaded video discussions, and affinity groups of viewers.

BACKGROUND OF THE INVENTION

Online and local video content is rapidly emerging as the dominant productivity medium in a variety of applications, such as instructional materials, training, education, e-commerce, marketing, product support and development, business communications and presentations, etc. This trend is reflected in recent market research, showing that just the size of the worldwide market for video marketing is expected to increase from $33 billion in 2020 to almost $46 billion by 2025. In 2022 people have been watching, on average, 19 hours of online video per week, a remarkable increase from 2018 when people were watching 10.5 hours of video weekly. An estimated 55% of Internet users watch online videos daily and 78% view videos online every week. Over 95% of Internet users watch explainer videos to learn more about a product or service; this category of videos has become the most created type of video content: 68% of users prefer to watch an explainer video on how to fix a product or service instead of getting in touch with customer support.

Video presentations are the third most popular type of video content, which becomes especially important with the emergence of distributed and hybrid lifestyles, where knowledge transfer and work may be performed asynchronously, saving time, and offering work flexibility to distributed teams. An important aspect of hybrid presentations is their growing use of Augmented Reality and immersive components, whereby realistic interior views of conference rooms and presentation environments co-exist with virtual backgrounds and objects, and where presenters (and potentially future viewers) are immersed within videos and may interact with the presentation materials. Such a system is provided, for example, by the mmhmm software and service, developed by mmhmm inc.

Existing video repositories for public, group, and enterprise use have been built for different content areas with broadly varying feature sets, including multiple video formats, diverse hosting, authoring, editing, and sharing options, libraries of reusable video content, etc. Notable examples include (i) public online video platforms YouTube, Bilibili, Twitch, Aparat, IQiyi, Vimeo, Youku (listed here in the order of Mar. 1, 2022 Alexa global rankings); (ii) general sites that offer video hosting as part of their functionality—Facebook, Tencent, Sina Weibo, Instagram, Twitter; (iii) video hosting providers for businesses, such as Brightcove, DaCast, Dailymotion Cloud; (iv) online video editing services—for example, Animoto, Clesh, Dailymotion, Blackbird; and other sites, applications, and services enhancing video sharing capabilities and experiences. Enterprise video repositories may allow video sharing and streaming among employees, existing and prospective customers, partners, and other relevant parties.

SUMMARY OF THE INVENTION

Notwithstanding a significant progress in authoring, hosting and support of enterprise and other organization-wide video repositories, many problems and untapped opportunities remain and waiting for attention from system architects and designers, developers, and owners of the video repositories. Existing authoring solutions are focused on a separate video creating and don't offer author and user-friendly mechanisms for referencing other repository items from within a new video. Video commenting is mostly restricted to text threads, while discussion threads comprised of videos are not offered. Additionally, user behavior that may depend upon enterprise specific factors, such as departmental and project structure, with the associated limitations and requirements, has not been explored. Specifics of viewer audiences and corresponding implications for search in enterprise video repositories and video assessment by new viewers have not been sufficiently studied and implemented in repository designs and viewing software.

Accordingly, it is important to develop mechanisms for enhancing asynchronous video repositories with video referencing and video commenting capabilities and with user behavior awareness.

According to the system described herein, a particular user selectively searching a video repository includes measuring physiological parameters of a plurality of users of the video repository while the users watch at least some of the videos of the video repository, determining attraction values of the users to the at least some of the videos based, at least in part, on the physiological parameters, forming groups of the users by maximizing an aggregate of attraction values to a subset of videos of the video repository that have been watched by at least one member of each of the groups, and searching only the subset of videos of the video repository that have been watched by at least one member of a particular group, the particular group corresponding to the particular user. The physiological parameters may include heart rate, eye movement, gaze direction, and/or facial expressions. The heart rate may be measured using wearable technology. Attraction values may also depend on feedback provided by the users after watching the videos. The feedback may be user assigned tags, recommendations, and/or assessments. The particular user may be a member of the particular group. Selectively searching a video repository may also include the particular user obtaining recommendations for videos of the video repository based on recommendations of a subset of members of the particular group. Forming groups of users that maximize an aggregate of attraction values for a subset of videos may include constructing a graph that, for all of the users, connects the user to each video of the video repository that the user has watched where, for all of the users, edges of the graph correspond to attraction values of the user to each video of the video repository that the user has watched. The aggregate of attraction values may be maximized if every video watched by one of the users of each of the groups has been watched by all of the users from each of the groups. The particular user may be determined to correspond to the particular group based on the particular user providing high rankings to at least some videos of the video repository rated higher than other videos by members of the particular group. The video repository may include original videos, referencing videos, and video discussion threads, where the original videos do not refer to other videos, the referencing videos include direct links to other videos in the video repository, and the video discussion threads include comments about the videos in the video repository. A portion of one of the videos that is referenced by a referencing video may be clipped or extracted and added to the referencing video. A portion of one of the videos that is referenced by a referencing video may be played unmodified in the referencing video. A presenter may be immersed into the videos that is referenced by a referencing video. The presenter may replace a previous presenter from the videos that is referenced by the referencing video.

According further to the system described herein, a non-transitory computer readable medium contains software that selectively searches a video repository for a particular user. The software includes executable code that measures physiological parameters of a plurality of users of the video repository while the users watch at least some of the videos of the video repository, executable code that determines attraction values of the users to the at least some of the videos based, at least in part, on the physiological parameters, executable code that forms groups of the users by maximizing an aggregate of attraction values to a subset of videos of the video repository that have been watched by at least one member of each of the groups, and executable code that searches only the subset of videos of the video repository that have been watched by at least one member of a particular group, the particular group corresponding to the particular user. The physiological parameters may include heart rate, eye movement, gaze direction, and/or facial expressions. The heart rate may be measured using wearable technology. Attraction values may also depend on feedback provided by the users after watching the videos. The feedback may be user assigned tags, recommendations, and/or assessments. The particular user may be a member of the particular group. The software may also include executable code that obtains recommendations for videos of the video repository based on recommendations of a subset of members of the particular group. Forming groups of users that maximize an aggregate of attraction values for a subset of videos may include constructing a graph that, for all of the users, connects the user to each video of the video repository that the user has watched where, for all of the users, edges of the graph correspond to attraction values of the user to each video of the video repository that the user has watched. The aggregate of attraction values may be maximized if every video watched by one of the users of each of the groups has been watched by all of the users from each of the groups. The particular user may be determined to correspond to the particular group based on the particular user providing high rankings to at least some videos of the video repository rated higher than other videos by members of the particular group. The video repository may include original videos, referencing videos, and video discussion threads, where the original videos do not refer to other videos, the referencing videos include direct links to other videos in the video repository, and the video discussion threads include comments about the videos in the video repository. A portion of one of the videos that is referenced by a referencing video may be clipped or extracted and added to the referencing video. A portion of one of the videos that is referenced by a referencing video may be played unmodified in the referencing video. A presenter may be immersed into the videos that is referenced by a referencing video. The presenter may replace a previous presenter from the videos that is referenced by the referencing video.

The proposed system assembles video repositories with three principal categories of videos (original, referencing, and threaded discussions), offers non-immersive and immersive video quoting and referencing for making referencing videos and threaded discussions, constructs a viewership graph and corresponding subgraphs for subsets of users, determines affinity index for subsets of users based on mutual attraction of the users to videos that the users are viewing, builds affinity groups that maximize affinity index, associates individual users (including new users) with affinity groups and applies associated affinity groups for advanced video and user search.

Various aspects of system functioning are explained as follows.

1. Types of videos in a repository. In the system described herein, there are three types of videos in a video repository: original videos, referencing videos, and video discussion threads. Original videos do not explicitly refer to other videos in the repository or elsewhere. Referencing videos have direct links to other repository entries and/or different types of quotes from such other entries, collectively called referred videos, or references. Video discussion threads include video comments of users to an original video, referenced video or another video thread. Some of the references, comments and other interactions may occur within the repository. However, given the ubiquity of video content and an increasing presence of video content in applications like Slack, Google apps, etc., repository items may refer, for example, to Slack video posts, YouTube videos, or similar and vice versa.

2. Video episodes. Three types of video episodes support the original and referencing videos and video discussion threads: fragments of original videos, video quotes, and video comments. Fragments of original videos are self-explanatory. Video quotes are authentic portions of other videos or the current video, embedded into the current video in different ways, as explained below. Video comments are videos referring to a portion of a different video and discussing content of the different video. The difference between referencing videos and video comments/discussion threads is that the former videos are backward looking and incorporate episodes of or references to previously created videos into a linear structure of a new (referencing) video, while video discussion threads look to disrupt the linearity of a video the discussions are commenting to and typically generate a tree-like or a more complex structure of interdependent video episodes and full videos.

3. Constructing derivative video episodes. There are a number of mechanisms for creating derivative video episodes that may be used in quotes or comments. Below are five mechanisms where the first three methods are non-immersive and the last two are immersive.
    a. Clipping referred content. A portion of a referred video may be separated from a source of the referred video and added to the corresponding referencing video. Clips may include a continuous fragment of the reference, a still frame, a sequence of frames, and combinations thereof. The content of the referred video is added to the referencing video in an authentic form, in full frames; the content of the referred video is not mixed with content of frames of the referencing video.

b. Extracting referred content. A portion of content of one or several frames of a reference is extracted from a referred video and added directly to one or more frames of the corresponding referencing video. The referred video content can be edited, annotated, etc. The referred video content may include static content within the reference, such as a presentation slide, an image, a snapshot of a presentation, etc.

c. Embedding referred content. A fragment of a reference is placed within a presentation channel (a channel pane, as described in U.S. Pat. No. 11,317, 060 by Phil Libin titled: "INDIVIDUAL VIDEO CONFERENCING SPACES WITH SHARED VIRTUAL CHANNELS AND IMMERSIVE USERS", issued on Apr. 26, 2022, and incorporated by reference herein) and replayed as part of a presentation or other content of the referencing video. One or more presenters in the referencing video may interrupt the embedded replay, comment on the embedded content, etc. Such an embedded fragment may be placed into a separate channel pane, for example, next to a core presentation or other content of the referencing video (see, for example, FIG. 3C and the corresponding description).

d. Immersion without replacing the referred presenter. Instead of playing an embedded referred episode within a scene of a referencing video, the presenter (or multiple presenters) of a referencing video is immersed into a clip (see 3a, above) and coexists with the presenter(s) (if any) of the referencing video. The immersed presenter(s) may comment on the content of the portion of the referencing video in the same way as in the previous section 3c—for example, by stopping the replay at certain points, adding comments, navigating the space of the quoted clip, and then resuming the replay.

e. Immersion with replacing the referred presenter. This is similar to 3d, described above, except the original presenter of the quote is removed or hidden and the presenter of the referencing application takes full control over the transformed quote. The audio channel of the original presenter may be removed or retained in the transformed quote.

4. Repository entities and attributes. The three major entities of a video repository are videos, authors, and users (viewers), characterized by a variety of attributes and performing multiple functions. General attributes may include general categorization of various entities (for example, categorization of videos by purpose, type, accessibility, categorization of authors by qualifications, users by interests, etc.); temporal attributes, such as lengths of videos, time taken by authors to create a video or by different categories of viewers to view the video; project lists and attributes. Entity specific attributes may include departments where authors and users work; tagging, recommendation and reaction/assessment functions (actions) of viewers; tag clouds or category lists for videos in the repository; reference graphs (trees) for referencing videos; discussion graphs for video discussion threads, etc.

5. Viewer attraction to videos; user similarity. Usefulness and an overall quality of a video repository may be expressed in terms of a widespread viewer (user) attraction to videos of the repository. The degree of attraction of an individual viewer p to a video v can be expressed by a value $\alpha(p,v)$ reflecting several factors, such as viewer attention to the video, viewer comprehension of content of the video and viewer actions on tagging, reacting to (including commenting), assessing, and recommending the video. Aggregation of the factors into a numeric attraction value may employ an additional technology stack, including facial and gesture recognition, eye-tracking (gaze detection) technologies, wearable devices, such as smart watches or smart bracelets, devices to measure a pulse of a viewer and other physiological parameters, and software components aggregating data from various technologies present in the stack into an estimate of viewer attention and comprehension levels.

Based on user attraction metrics, it is possible to define user similarity with respect to a given video, $$\mu(p,q,v)=\theta(\alpha(p,v),\alpha(q,v)),$$

where p and q are two users, v is a video, and $\theta(\ )$ is an aggregation function.

Semantically, the aggregation function $\theta$ may reflect a fuzzy statement "two users are similar (close) to each other with respect to a particular video to the extent the two users are both attracted to the particular video"; accordingly, one of the models for the aggregation function could be a fuzzy conjunction "two users p and q are similar (close) if p is attracted to v AND q is attracted to v"; the fuzzy conjunction AND may be represented by a variety of options explained in in connection with fuzzy logic; the most simple among the broadly accepted models for fuzzy conjunction is $$\mu(p,q,v)=\min(\alpha(p,v),\alpha(q,v)).$$

6. User and video affinity groups. Video consumption for a purpose of viewing (rather than authoring and commenting on videos) is reflected by a viewership graph V (shown in FIG. 8), which is a weighted bipartite graph having edges that connect each particular viewer to all videos that the particular viewer has watched, and the weights of the edges are attraction values.

An affinity index $\varepsilon(U)$ of a subset U of users can be defined as an aggregated value, with an aggregation function $\mathcal{A}(\ )$, of the attraction values of all videos watched by at least one user in the subset (including zero attraction values for the tuples (u, v), $u \in U$, $v \in V(U)$, where the user u did not watch the video v), $$\varepsilon(U)=\mathcal{A}(\{\alpha(u,v)\}|u\in U, v\in V(U))$$

Affinity groups for the viewership graph (and for the status of a video repository) are defined as subsets of users that maximize the affinity index.

So, an affinity group is a subset of users that have the highest coherence in attitudes of the users toward the videos the users have watched. In the particular case of a binary non-weighted graph (weights of all edges are equal to 1) and an averaging aggregation function, an affinity index of a subset of users is maximized (and has a maximum value of 1) if and only if every video watched by one of the users has been watched by all users from the subset, that is, the restriction of the viewership graph on the subset of users is a complete bipartite graph. The closer to this ideal situation is a particular subset of users, the higher is the affinity index. Notes:

1. An alternative way of defining affinity groups for a viewership graph may be based on the aggregated similarity values u (p, q, v).

2. A dual object to a user affinity group is a video affinity group, constructed by mirroring the original definition of an affinity index:

$$\hat{\varepsilon}(V)=\hat{\mathcal{A}}(\{\alpha(u,v)\}|v\in V, u\in \mathcal{V}^{-1}(V)) \to \max$$

A set of the most attractive videos V*(𝔸) for a user affinity group 𝔸 may be defined in a variety of ways—for example, as a set of videos, maximizing an average attraction for all viewers in the affinity set who have watched the video.

7. Associating users with affinity groups. Users that don't belong to any affinity group may be associated with a closest affinity group using different mechanisms that may depend on user status with respect to the video repository. For example, if a user p has accumulated viewership experiences, it may be possible to assess similarity values $\mu(p, q, v)$ (see section 5 above) for some of the videos v, where the second parameter q scans available members of the affinity sets, and similarity values are subsequently aggregated by affinity groups to find a closest group to the user p. For a new user p where the similarity values don't exist or aren't available for enough viewers in the affinity groups of users, a set of videos $v_i^j \in V^*(\mathbb{A}_i)$ for a collection $\{\mathbb{A}_i\}$ of affinity groups may be offered for choice or ranking by the new user and an affinity group corresponding to the appropriate choice or the best ranking by the new user may be associated with the user p.

8. Using affinity groups. There are multiple application areas for affinity groups in conjunction with video repositories, including enhanced video search and obtaining new sources of video recommendations among experienced users:

a. Enhanced video search narrows down the search area for a user to a set of videos watched by the members of an affinity set associated with the user, which is less than all of the videos in the repository. If narrowing the search this way does not yield a satisfactory result, a subsequent search may be enhanced by ranking search alternatives by similarity of the alternatives to the videos watched by the associated affinity set. Similarity between videos is a dual concept to the similarity between users discussed in section 5; the formulas are analogous.

b. New sources of video recommendations. This reflects a situation when a user wishes to receive video recommendations outside of department of the user to broaden knowledge of the user of the repository and videos. In this case, the user may refer to the members of an associated affinity set who (i) are providing recommendations to other users; and (ii) are working for other departments.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for creating and using asynchronous video repositories, embedding references into asynchronous videos, building video discussion threads, identifying affinity groups of viewers of video content, and offering new mechanisms for searching in video content and of providing assessment of videos by individual viewers by utilizing association of the individual viewers with the affinity groups.

Figure 1:
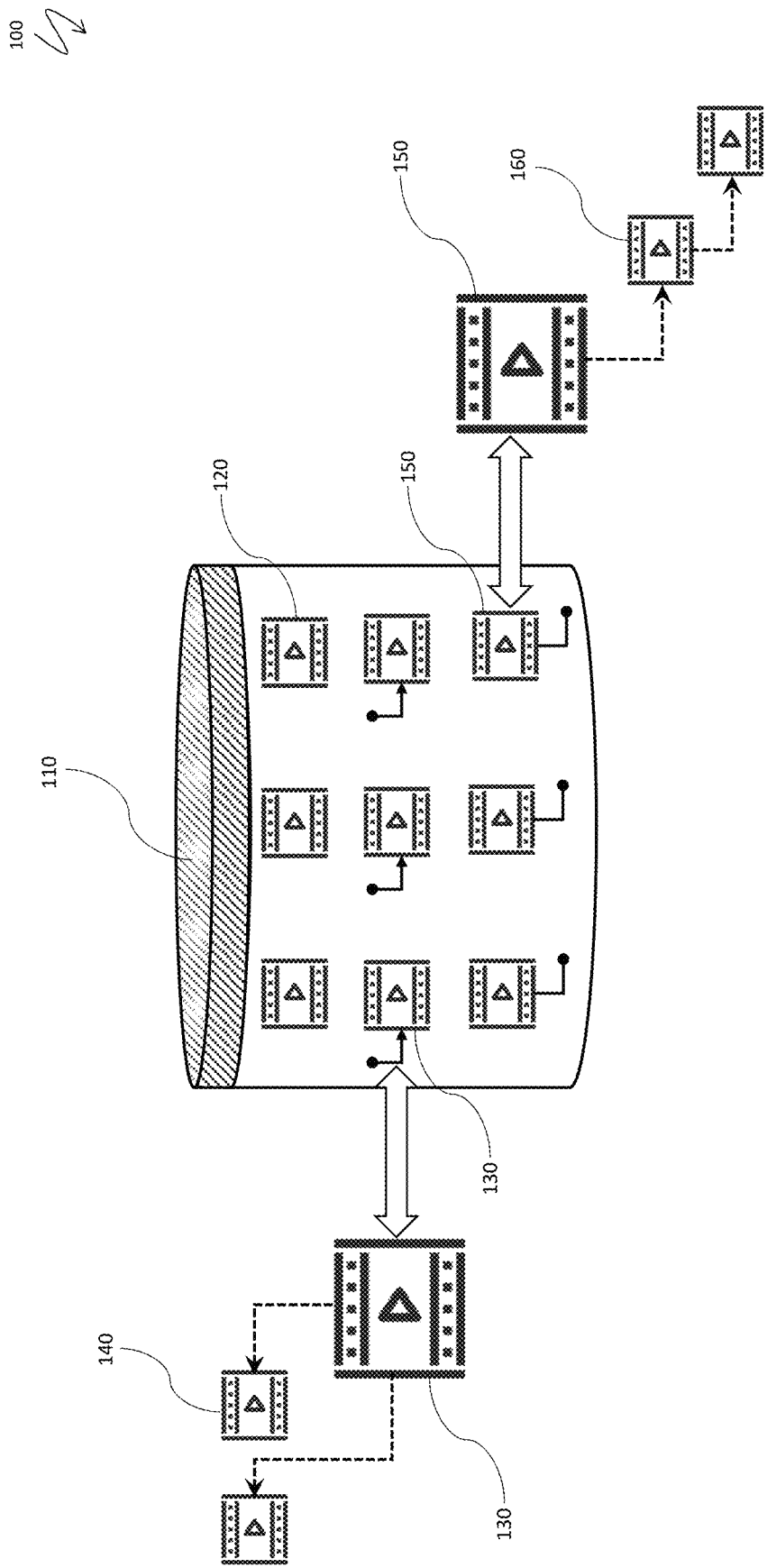
FIG. 1 is a schematic illustration of types and components of video repository entries, according to an embodiment of the system described herein.

FIG. 1 is a schematic illustration 100 of types and components of video repository entries. A video repository 110 may include videos of three different types: original videos 120, referencing videos 130, and video discussion threads 150, each type having a unique icon. Original videos do not explicitly refer to other videos in the repository or elsewhere.

Referencing videos 130 have direct links to other repository entries and/or different types of quotes from such other entries 140, collectively called referred videos, or references. Video discussion threads 150 include video comments 160, potentially multi-level, by users.

Figure 2:
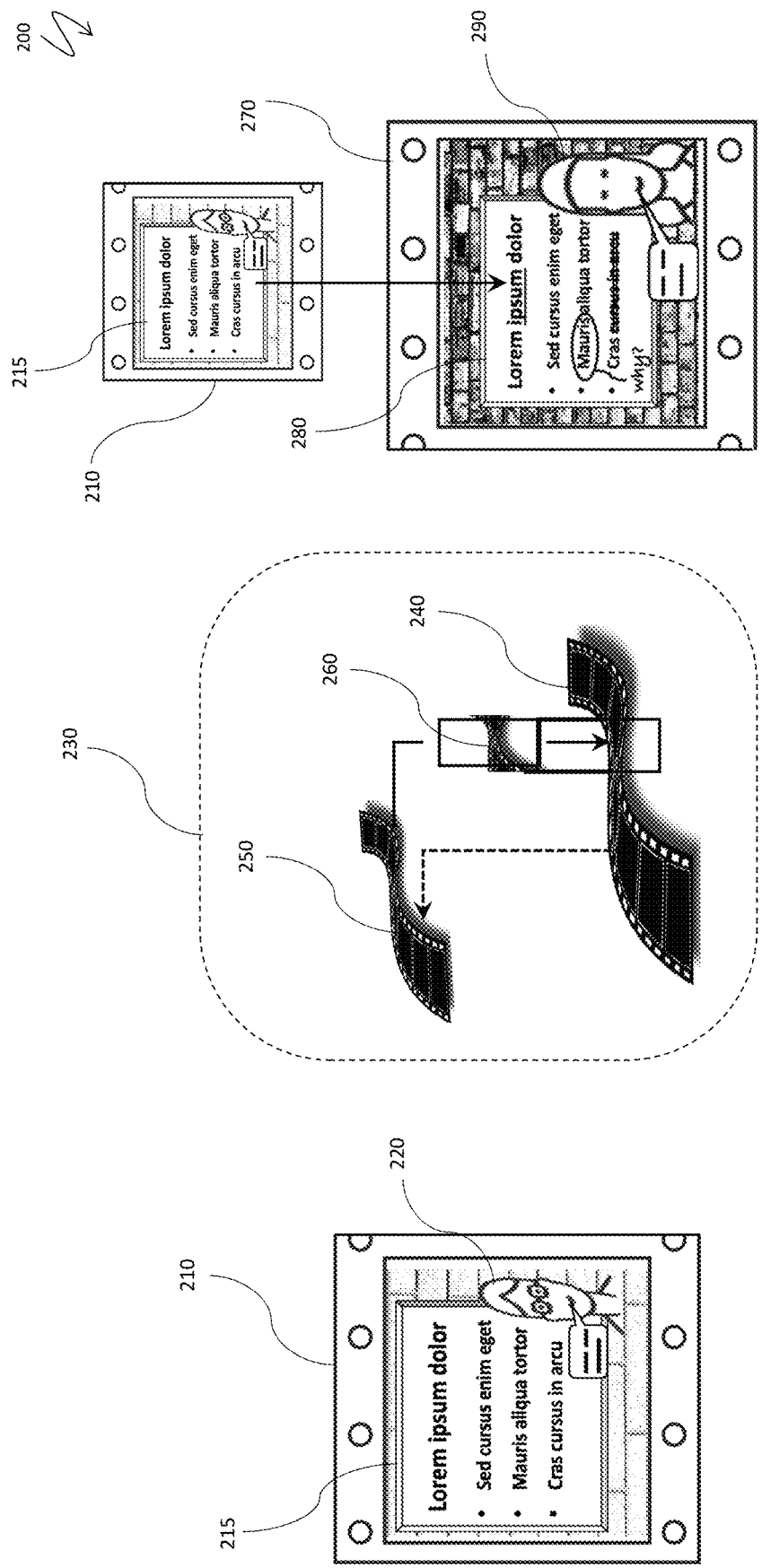
FIG. 2 is a schematic illustration of various types of video episodes, according to an embodiment of the system described herein.

FIG. 2 is a schematic illustration 200 of various types of video episodes. An episode 210 of an original video (item 120 in FIG. 1, not shown in FIG. 2) may include, for example, a fragment of a presentation of a slide 215 by a presenter 220. A quote episode 230 of a referencing video includes a referencing video 240, a reference 250 and a fragment 260 of the reference 250, extracted from the reference and embedded into the referencing video 240. An episode 270 of a video comment uses some extracted content—in this example, a slide 215—from an episode 210 of an original video; a modified extracted content 280 is presented in the episode 270 of the video comment and a user 290 provides verbal comments.

FIGS. 3A-3E are schematic illustrations of five mechanisms for constructing derivative video episodes.

Figure 3C:
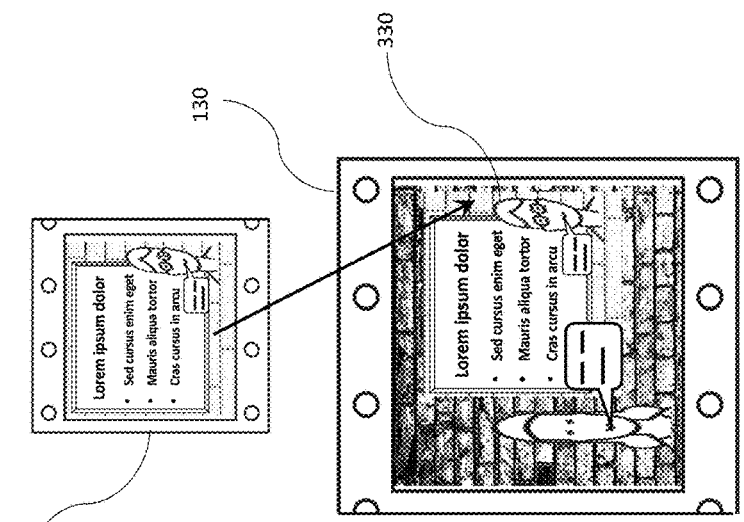
FIGS. 3A-3E are schematic illustrations of five different ways to construct derivative video episodes, according to an embodiment of the system described herein.
Figure 3B:
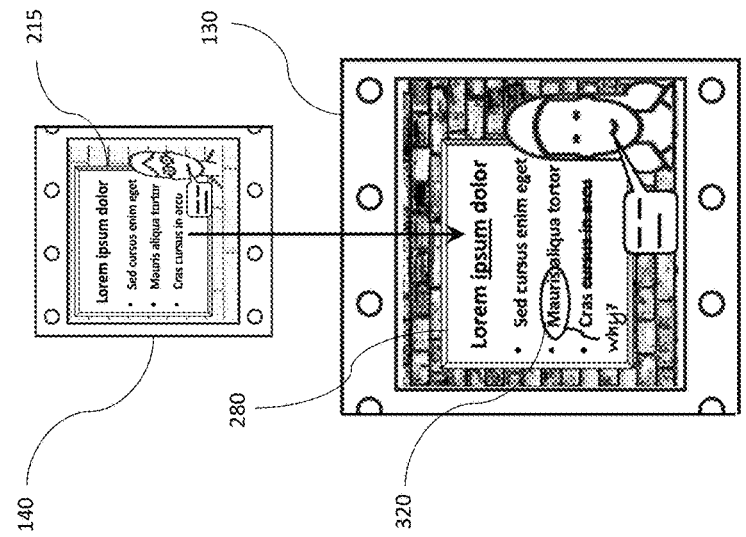
Figure 3A:
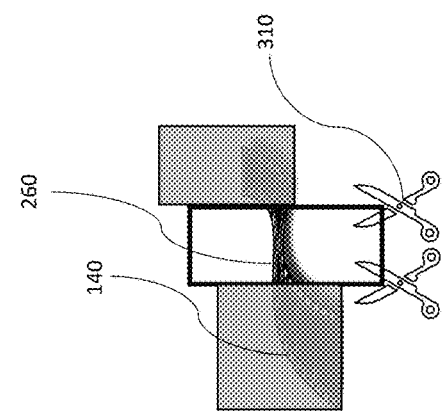

FIG. 3A schematically illustrates constructing derivative video episodes by clipping referred content, whereby a derivative video episode (a quote) 260, introduced in FIG. 2, is obtained from a referred video 140 (see FIG. 1) via a clipping operation 310.

FIG. 3B is a schematic illustration of constructing derivative video episodes by extracting and modifying portions of a referred content, whereby a derivative video episode within a referring video 130 is obtained by extracting a portion of content 215 (in this example, a slide, see FIG. 2 for more information) of the referred video 140, adding it to the derivative episode of the referring video 130, and potentially using a modification (markup) 320 to create the modified content 280 (introduced in FIG. 2).

FIG. 3C is a schematic illustration of constructing derivative video episodes by embedding a referred content, whereby a derivative video episode within a referring video 130 is created by direct embedding of an episode of a referred video 140 by replaying the full unmodified copy of the referred episode as a portion 330 within the referring video 130.

Figure 3E:
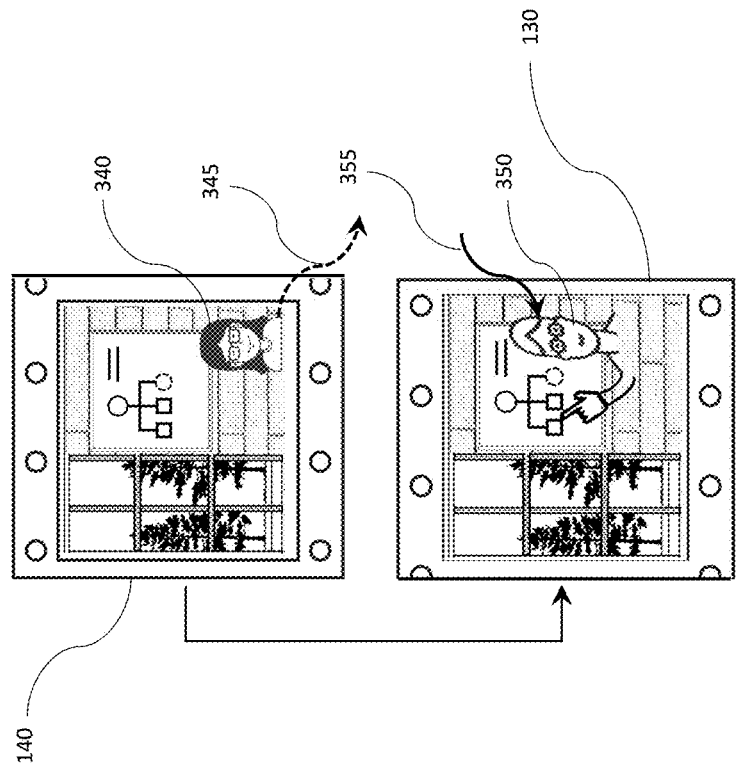
Figure 3D:
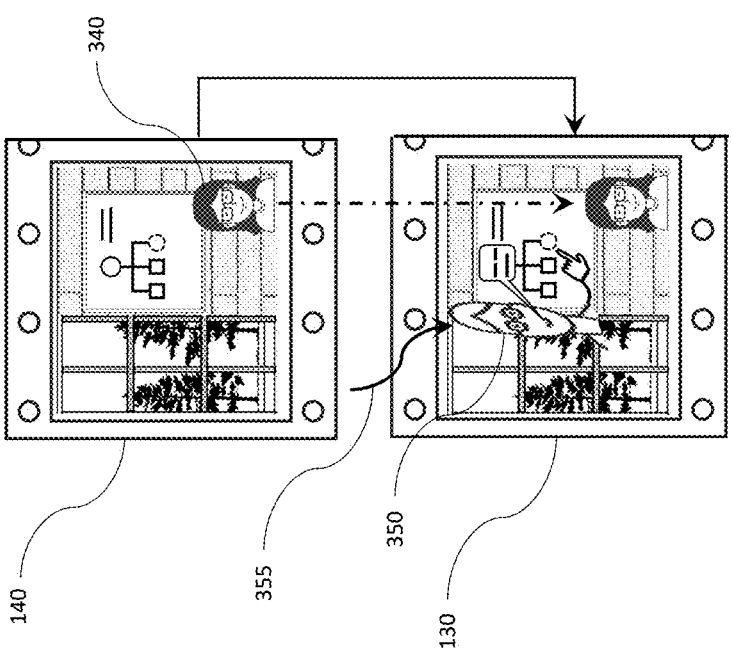

FIG. 3D is a schematic illustration of constructing derivative video episodes by immersing a presenter (commenter) into a referred content without replacing an original presenter, whereby an episode of a referred video 140 includes a presenter 340 and is copied into the referring video 130, where an additional presenter/commenter 350 is added to explain the referred content, as shown by an arrow 355.

FIG. 3E is a schematic illustration of constructing derivative video episodes by immersing a presenter (commenter) into a referred content replacing an original presenter, whereby an episode of a referred video 140 initially includes a presenter 340 and is copied into the referring video 130, while the original presenter 340 is deleted from the referred content, as shown by an arrow 345, and is replaced by a new presenter/commenter 350, added to the referring video 130 to explain the referred content, as shown by the arrow 355.

Figure 4:
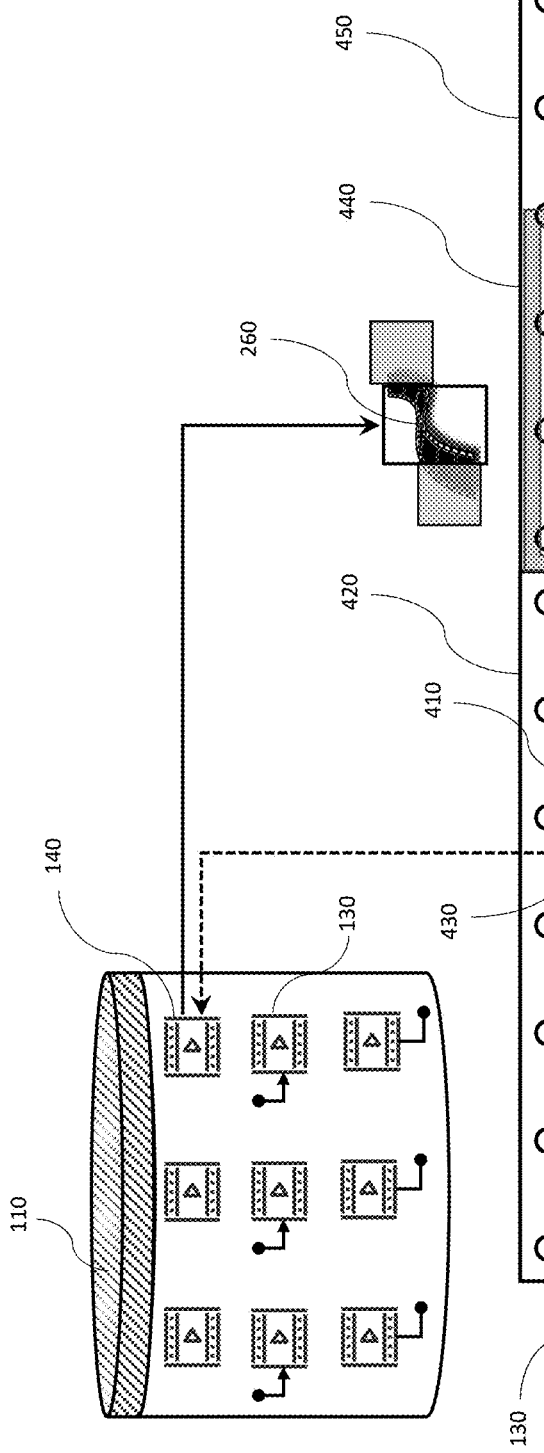
FIG. 4 is a schematic illustration of a workflow for a referring video, according to an embodiment of the system described herein.

FIG. 4 is a schematic illustration 400 of the workflow for a referring video. The video repository 110 includes the referring video 130 and a corresponding one of the entries 140, a reference video. The referring video 130 is a presentation with a presenter 410. At some point during the flow of the video 130, during an episode 420, the presenter 410 makes a gesture 430 to invoke the reference video, which in this case is represented by a quote 260, clipped from the referred video (which may be a proper video episode, a still image, etc.). The clip 260 is added to the referring video 130 as an episode 440 and is followed by the rest of the referring video, as shown by an item 450.

Figure 5:
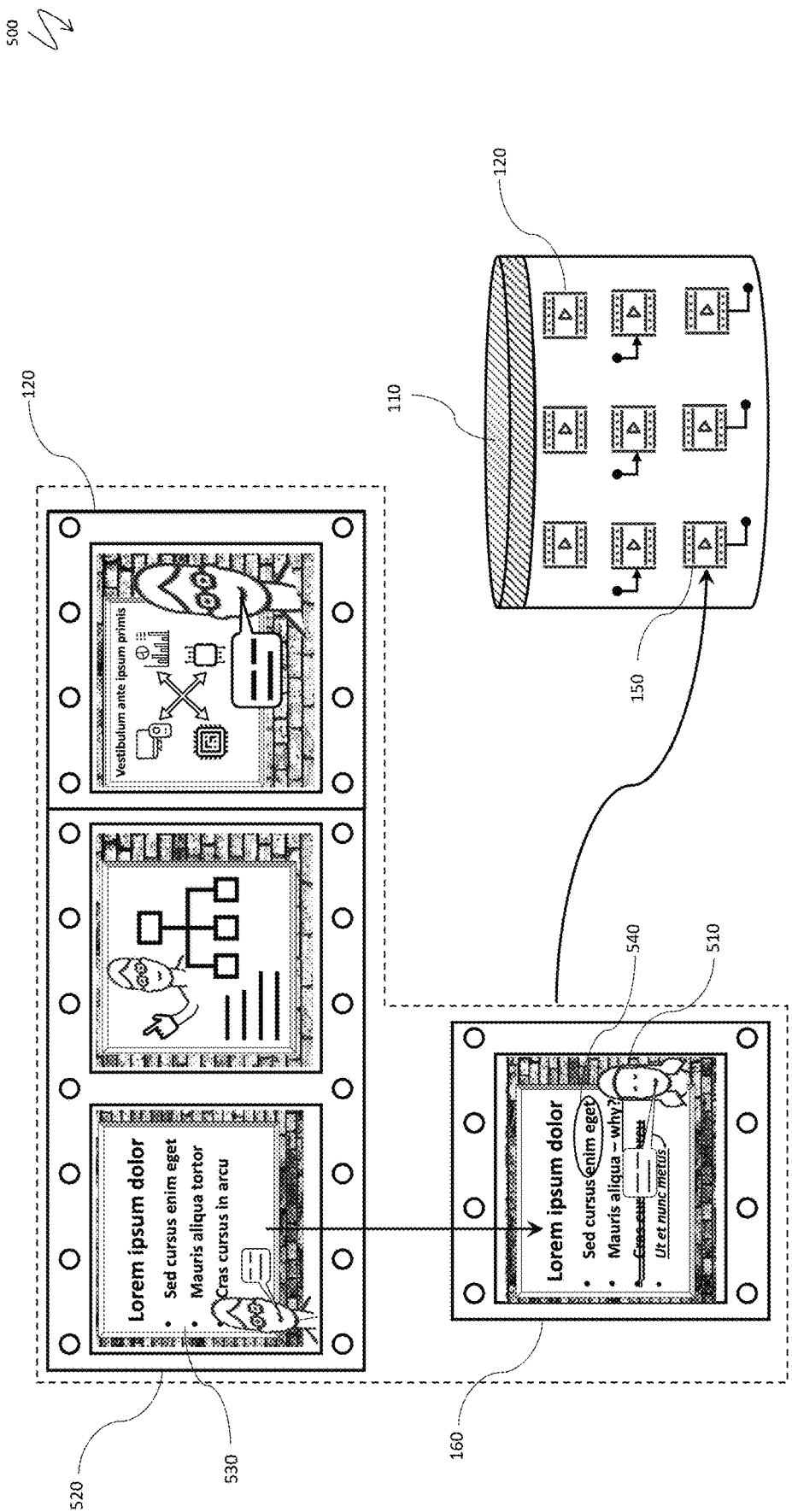
FIG. 5 is a schematic illustration of the creation of a threaded video discussion, according to an embodiment of the system described herein.

FIG. 5 is a schematic illustration 500 of creation of a threaded video discussion. The original video 120 from the video repository 110 is replayed by a user 510 who adds the video comment 160 (see FIG. 1 and the accompanying text for details) to a first episode 520 of the original video 120. The video comment 160 is produced by extracting a portion of the content 530 of the episode 520, adding markup 540 and commenting on the modified content by the user 510. The threaded video discussion 150 is saved to the video repository 110.

Figure 6:
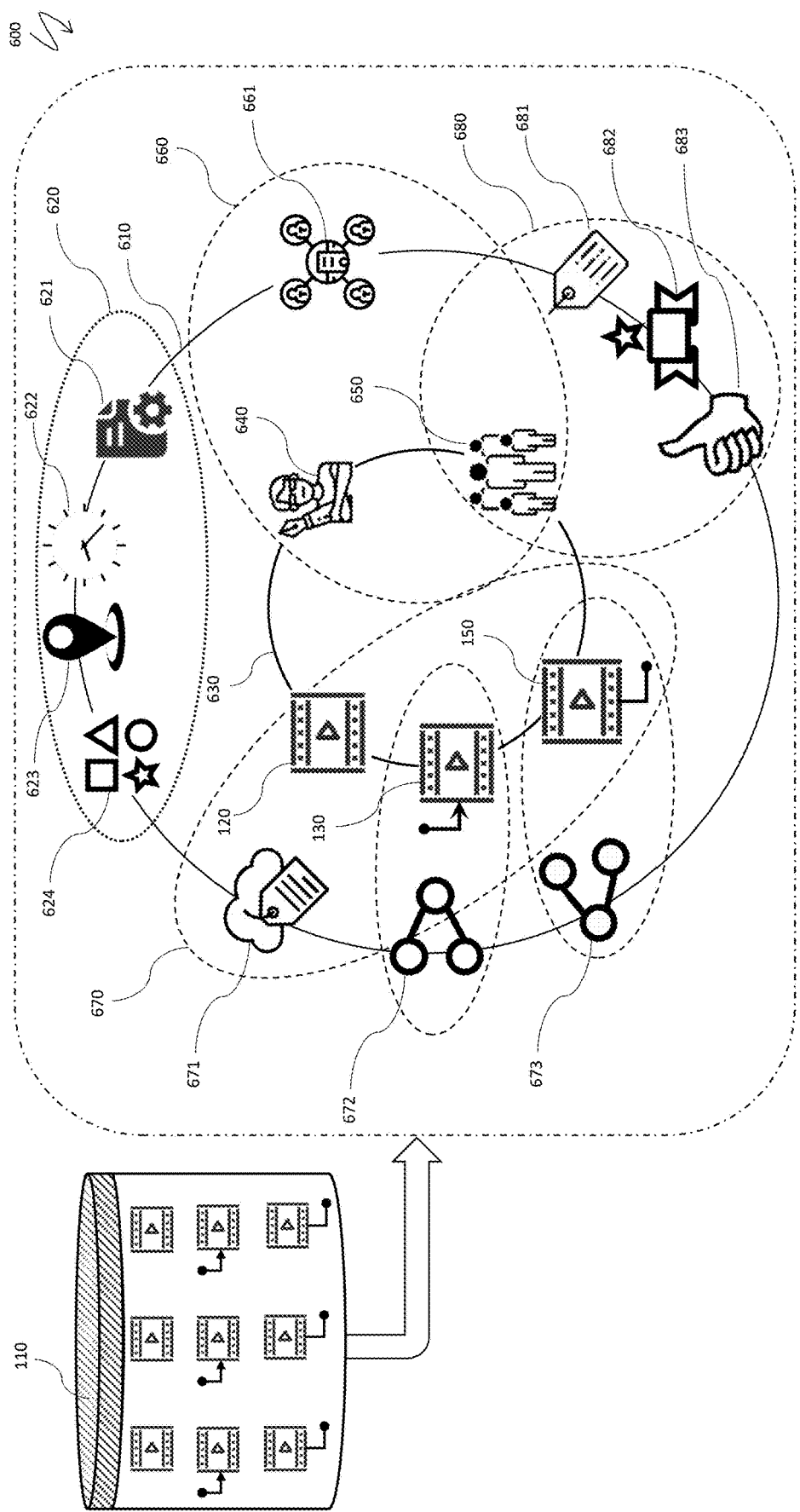
FIG. 6 is a schematic illustration of structure, entities, and attributes of a video repository, according to an embodiment of the system described herein.

FIG. 6 is a schematic illustration 600 of structure, entities, and attributes of the video repository 110. A group of entities 630 of the video repository 110 includes, in the first place, the stored videos 120, 130, 150, the three main types of which are explained in connection with FIG. 1. Two other types of entities 630, closely associated with the videos 120, 130, 150, are authors (creators) 640 of the videos 120, 130, 150 and viewers 650 of the videos 120, 130, 150. The entities 630 may be characterized by a broad set of attributes 610. General attributes 620 may include high-level projects 621 of an enterprise or other organization that define the video content of the repository; temporal characteristics 622 (creation time, length, season, special dates, etc.); geographical and location characteristics 623; general categorization 624 (for example, a thematic characterization, such as work, home, travel, events). A people specific group 660 of entity attributes may include placement of the authors 640 and users 650 in an organizational/corporate structure 661, such as departments to which the entities 640, 650 are assigned. A video specific group of entity attributes 670 may include tag clouds 671 used to tag all three types of videos; reference trees 672 for referred videos 130; and discussion graphs 673 for video discussion threads 150. Yet another group 680 of entity attributes applicable to the users 650 includes user actions of tagging videos 681, posting recommendations 682, and user reaction/assessment attributes 683.

Figure 7B:
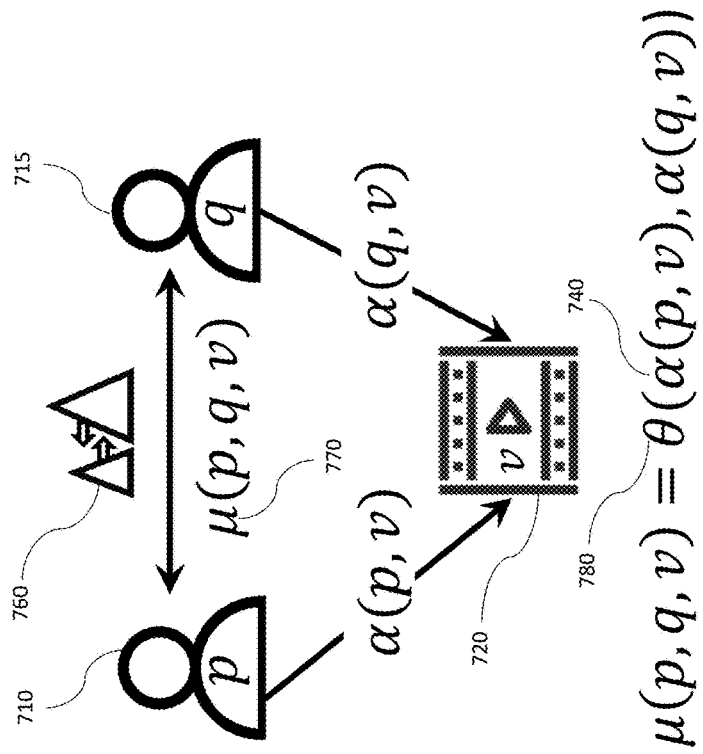
FIGS. 7A-7B are schematic illustrations of measuring viewer attraction to videos and an associated similarity between viewers, according to an embodiment of the system described herein.
Figure 7A:
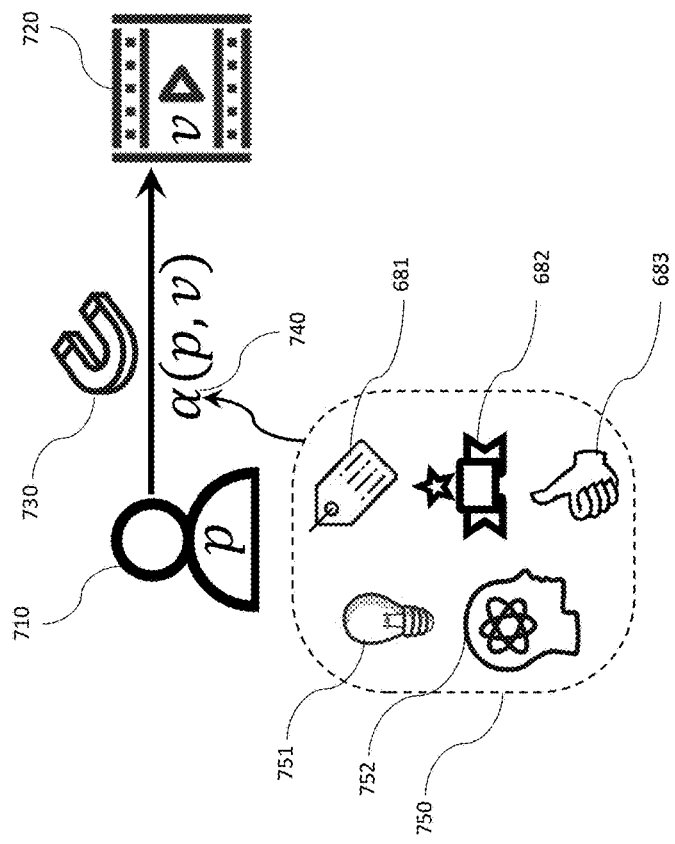

FIGS. 7A-7B are schematic illustrations of measuring viewer attraction to videos and an associated similarity between viewers.

FIG. 7A is a schematic illustration of measuring viewer attraction to a video. When a viewer 710 (p) watches a video 720 (v), attraction 730 of the viewer 710 to the video 720 (the attractiveness of the video to the viewer) may be quantified, and a value 740 $\alpha(p, v)$ of the attraction 730 may be derived from a variety of parameters 750, such as an attention level 751 (which may include, for example, temporal characteristics of viewing—see FIG. 6 for more information), a comprehension level 752, presence and nature of feedback of the viewer 710, such as viewer tags 681, recommendations 682, and reactions (assessments) 683, explained elsewhere herein (see FIG. 6 and the accompanying text in connection with attributes of a video repository). Viewer feedback may be entered by the viewer 710 post-viewing, while other parameters may be measured during the viewing process using a technology stack that may track viewer behavior and sentiment, including facial, gesture and poster recognition, eye tracking, sentiment recognition, etc.

FIG. 7B is a schematic illustration of measuring similarity (closeness) of two users with respect to a video. When two viewers (p, q), the viewer 710 and another viewer 715, have watched the video 720 (v) (typically, at the different times but joint viewing is also possible), a similarity 760 between the two viewers 710, 715 with respect to the video 720 may be quantified and expressed by a value 770, aggregated from the values 740 corresponding to viewer attraction using an aggregation function 780. Several interpretations of the aggregation function 780 are explained elsewhere herein (see, for example, section 5 of the Summary).

Figure 8:
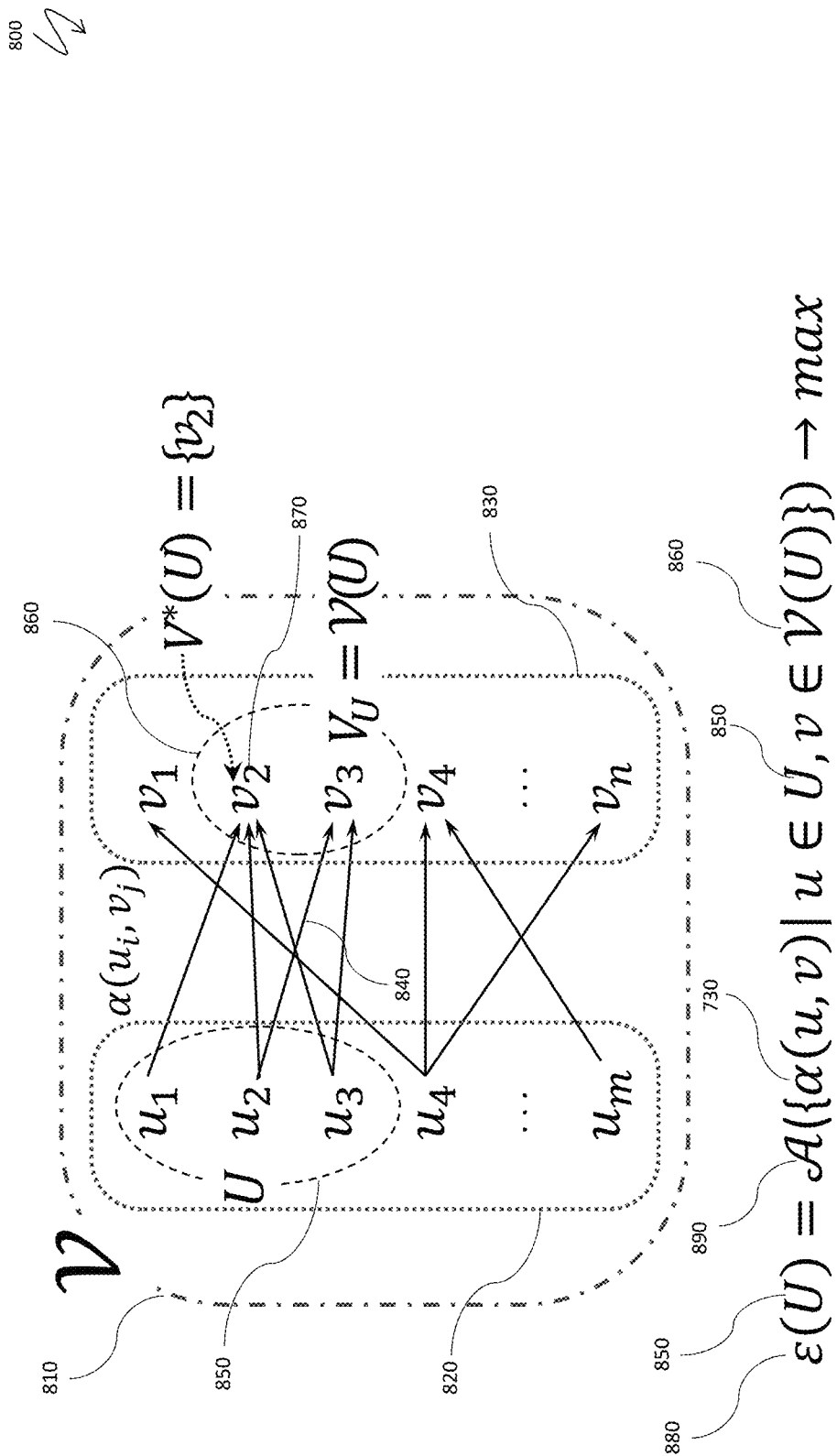
FIG. 8 is a schematic illustration of identifying user affinity sets defined by the viewership graph, according to an embodiment of the system described herein.

FIG. 8 is a schematic illustration 800 of identifying user affinity sets defined by a viewership graph (v) 810, which is a bipartite graph with two sets of nodes: a first set 820 that represents viewers (users) and a second set 830 that includes videos from a video repository. Edges 840 of the graph 810 show which viewers watched which videos.

For each group (subset) 850 of viewers, (U), a corresponding subset of videos 860 ($V_U = v(U)$) includes all videos that have been viewed by at least one viewer from the group 850. The videos 860 include a subset of most attractive videos 870 ($V_U^*$). In FIG. 8, the subset 870 includes a single most viewed video that, for example, has been watched by all three viewers from the group 850, whereas any other video in the subset 860 of videos watched by the group 850 has been watched by less than three viewers. Other definitions of a subset of most attractive videos for a group of viewers are explained in sections 6 and 7 of the Summary.

An affinity index 880 ($\varepsilon(U)$) for a group of the viewers 850 is defined as an aggregated value, with an aggregation function 890 ($\mathcal{A}$ ( )) of all attraction values for viewers from the group 850 to all videos 860 the viewers from the group 850 have watched; if a particular viewer in the group 850 did not watch a particular video in the subset 860, the attraction value for the particular viewer/video pair is set to zero. The affinity index of a group of viewers measures the alignment of viewers in the group with respect to viewership by all members of the group.

Affinity sets of viewers are groups of viewers that have a maximum possible value of an affinity index. In practical applications, a maximum possible value may be extended, for example, to 5-10%, so affinity sets may include any group of viewers for which the affinity index reaches at least 90-95% of the maximum possible value.

Figure 9:
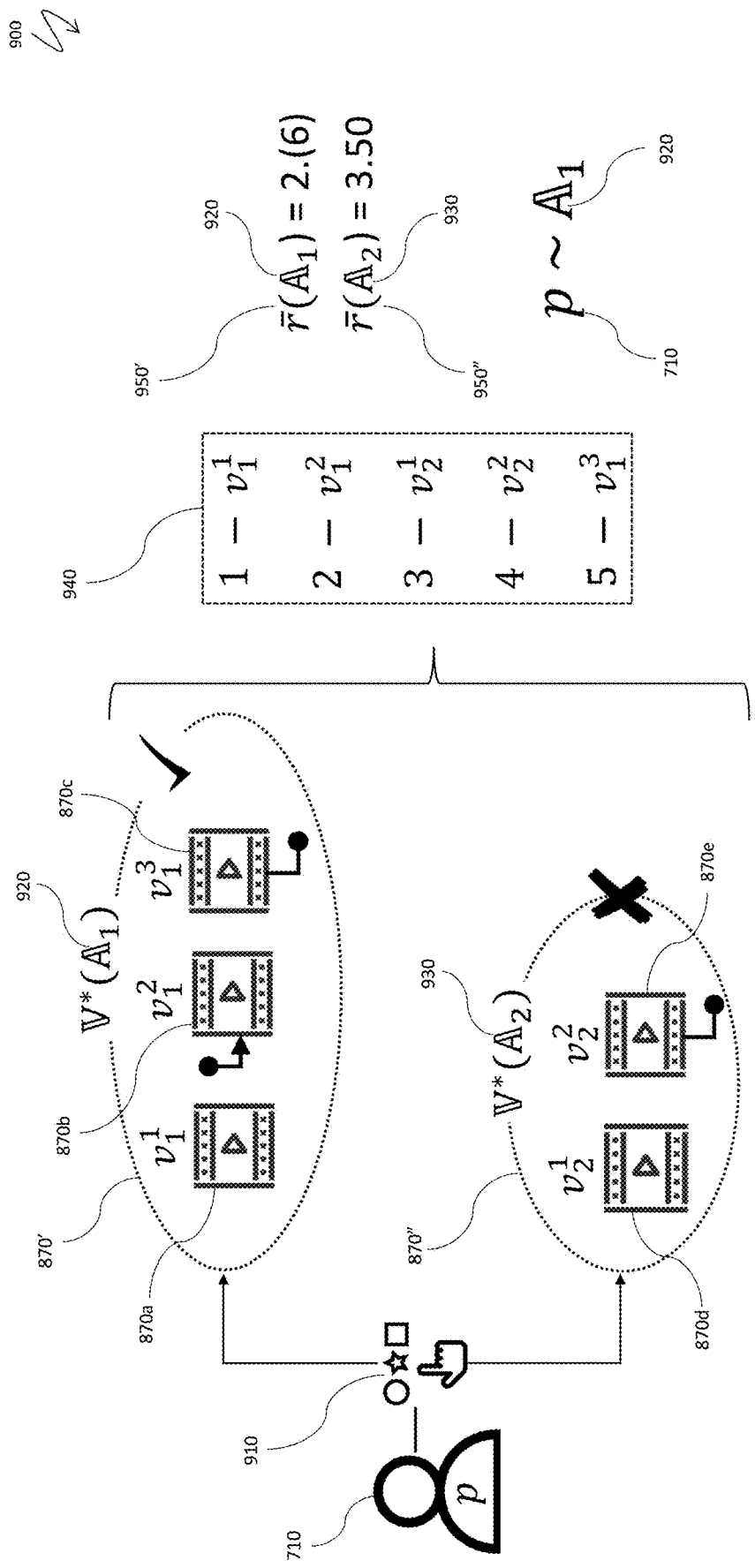
FIG. 9 is a schematic illustration of associating viewers with affinity sets via choice and ranking of videos, according to an embodiment of the system described herein.

FIG. 9 is a schematic illustration 900 of associating viewers with affinity sets via choice and ranking of videos. While many viewers are automatically included in affinity sets based on maximization of the affinity index, as explained in conjunction with FIG. 8, new viewers who have not accumulated sufficient volumes of viewership of video repository entries may not be able to immediately be part of an affinity set using the mechanism described above in connection with FIG. 8. FIG. 9 offers an alternative mechanism of associating viewers with affinity sets of viewers based on ranking of most attractive videos for viewers of affinity sets.

In FIG. 9, the viewer 710 is offered to perform a ranking 910 of several most attractive videos for users of two affinity sets 920 ($\mathbb{A}_1$) and 930 ($\mathbb{A}_2$). Generally, the user may be deemed to be associated with one of the affinity sets 920, 930 based on the user providing high rankings (high average rankings) to at least some videos of the video repository 110 rated higher than other videos by members of one of the sets 920, 930. Following the notations of FIG. 8, a first set 870' of most attractive videos for the viewers from an affinity set 920 includes three videos 870a, 870b, 870c having icons that show that video 870a is an original video, the video 870b is a referring video, and the video 870c is a video discussion thread. A second set 870" of most attractive videos for the viewers from an affinity set 930 includes two videos, an original video 870d and a video discussion thread 870e.

After the viewer 710 has a chance to watch all five videos, the viewer 710 provides a ranking 940, ordering all five of the videos 870a-870e in an order of preferences (a lower ranking number corresponds to the higher ranking). According to the ranking 940, an average ranking value 950' for most attractive videos connected to the affinity set 920 is 2.(6), while an average ranking value 950" for most attractive videos connected to the affinity set 930 is 3.50. Accordingly, the videos connected to the first affinity set 920 have a higher preference (the lower average ranking number), so if the choice of association of the viewer 710 is between the affinity sets 920, 930, then the adequate choice is the affinity set 920. Generally, the user may be deemed to be part of one of the affinity sets 920, 930 based on the user providing high rankings (high average rankings) to at least some videos of the video repository 110 rated higher than other videos by members of one of the sets 920, 930.

Figure 10:
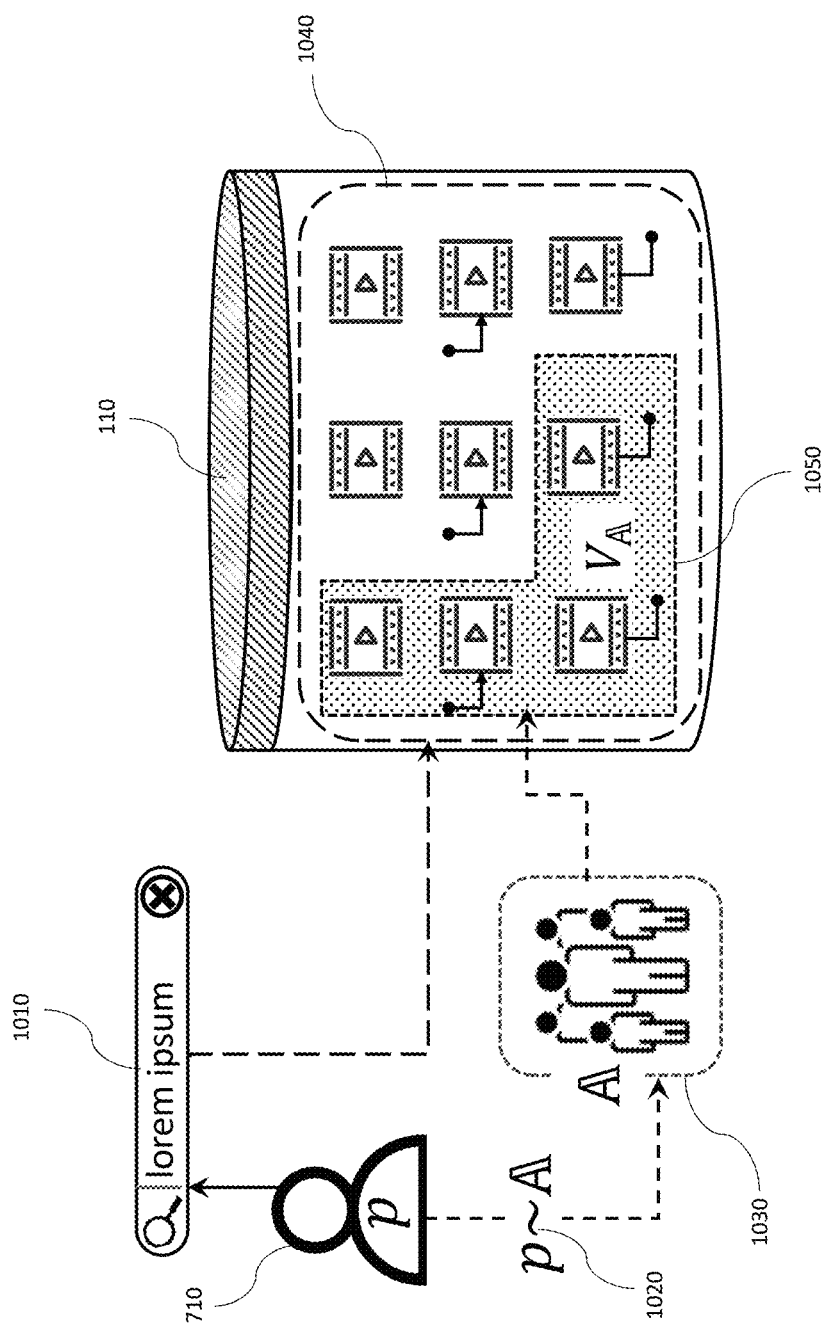
FIG. 10 is a schematic illustration of using affinity sets for an enhanced search in a video repository, according to an embodiment of the system described herein.

FIG. 10 is a schematic illustration 1000 of using affinity sets for an enhanced search in the video repository 110. The viewer 710 enters a search term 1010 to find videos in the video repository 110. A conventional search domain 1040 includes all videos from the video repository 110. However, if the viewer 710 is associated with an affinity set 1030 ($\mathbb{A}$), as indicated by an association term 1020, some of the preferences of the viewer 710 are known from association with the affinity set 1030. Accordingly, the search domain may be restricted to a set 1050 of videos watched just by the members of the affinity set 1030 offering the choices, more closely aligned with preferences of the viewer 710 (see the videos 860 in FIG. 8, denoted as V$\mathbb{A}$ in FIG. 10 to underscore connections with the notation $V_U$ in FIG. 8 and the affinity set $\mathbb{A}$).

Figure 11:
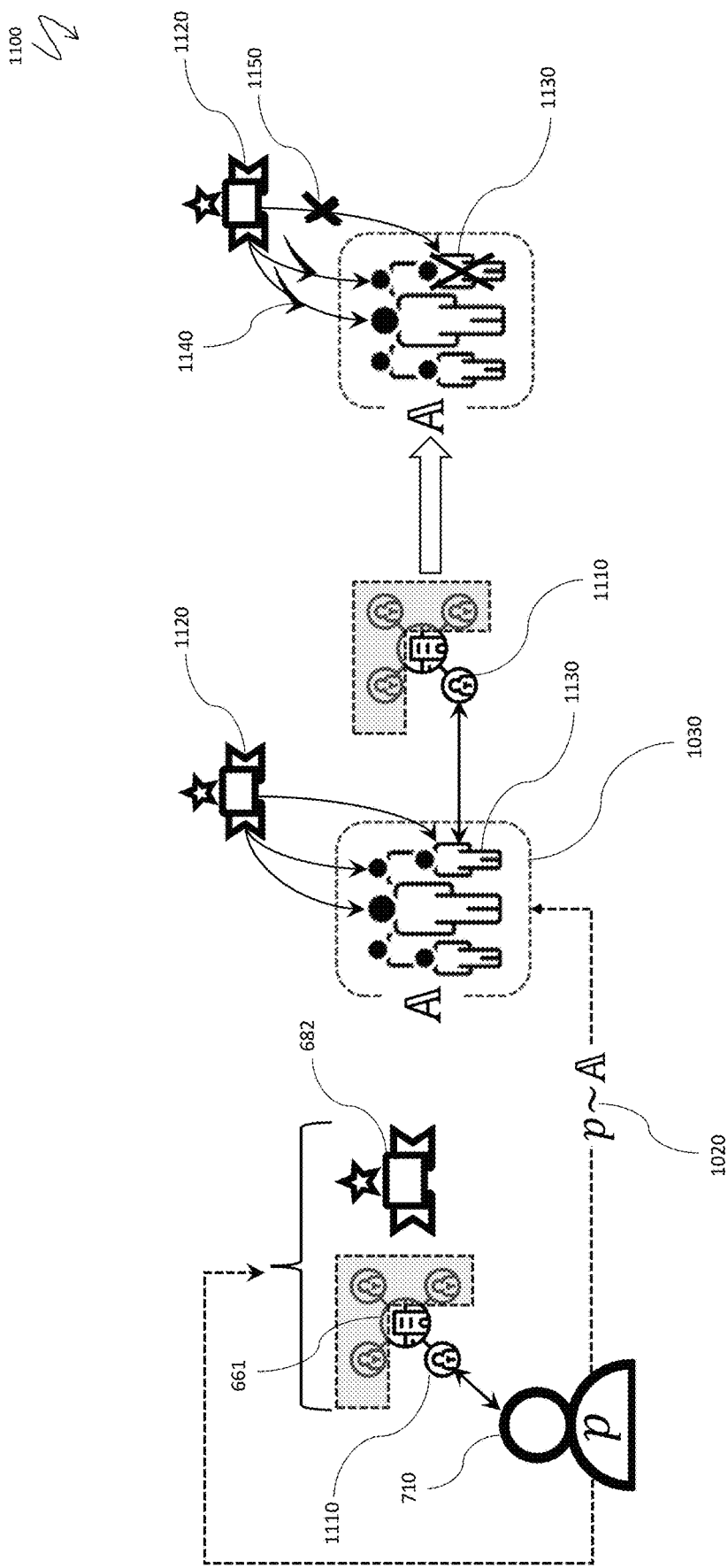
FIG. 11 is a schematic illustration of usage of affinity sets for enhancing viewer recommendations, according to an embodiment of the system described herein.

FIG. 11 is a schematic illustration 1100 of usage of affinity sets for enhancing viewer recommendations. The viewer 710 is working for a department 1110 in the organizational structure 661 (see FIG. 6 and the accompanying text for more information). Accordingly, the viewer 710 is most familiar with the list of the viewer recommendations 682 concerning videos that have been posted by members of the department 1110.

Referring to the affinity set 1030 (indicated by the association term 1020—see FIG. 10) may expand the scope of viewer recommendations close to the opinions and tastes of the viewer 710. For this purpose, a set 1120 of viewer recommendations regarding the videos in the video repository 110, posted by members of the affinity set 1030, may be filtered as follows. First, members 1130 of the affinity set 1030, working for the same department 1110 as the viewer 710, are identified. Next, all recommendations 1140 from the set of recommendations 1120 made by the members of the affinity set 1030, excluding recommendations of the members 1130 (working for the same department) may be delivered to the user 710, while the recommendations 1150 made by the users 1130, may be blocked. The user effectively receives the recommendations of a subset of the members of the affinity set 1030. In this way, the viewer 710 may receive new fresh recommendations and a broader perspective of the video repository.

Figure 12:
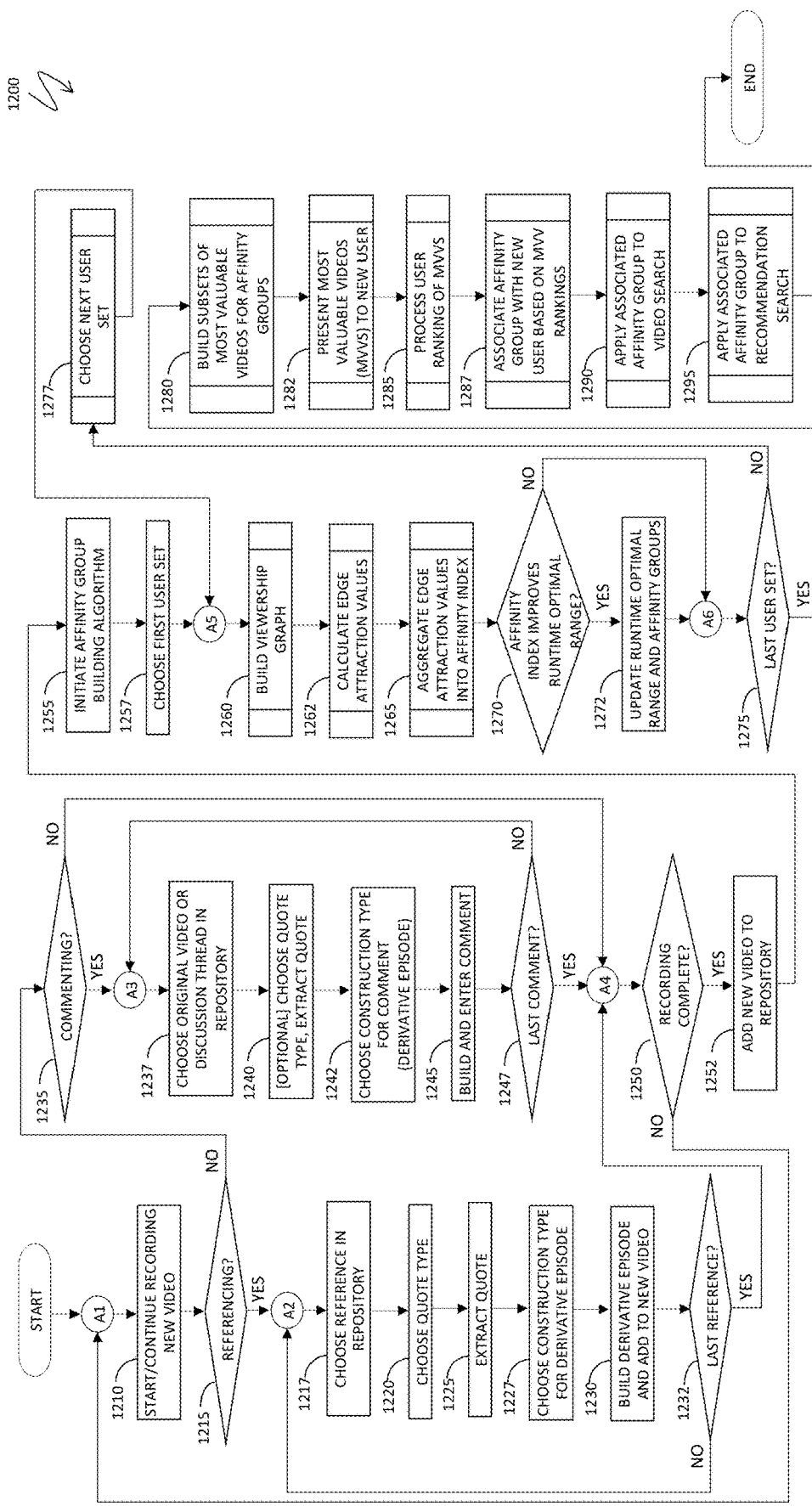
FIG. 12 is a system flow diagram illustrating system functioning in connection with asynchronous video repositories, threaded discussions, and affinity groups, according to an embodiment of the system described herein.

Referring to FIG. 12, a system flow diagram 1200 illustrates system functioning in connection with asynchronous video repositories, threaded discussions, and affinity groups. Processing begins at a step 1210, where an author (in particular, a presenter) starts or continues recording a new video or commenting to other videos in the repository. After the step 1210, processing proceeds to a test step 1215, where it is determined whether the video recorded at the step 1210 is a referencing video (see FIG. 1 and the accompanying text). If so, processing proceeds to a step 1217, where the author chooses a referenced video in the video repository, as explained elsewhere herein (see, for example, FIG. 4 and the accompanying text). After the step 1217, processing proceeds to a step 1220, where the author chooses a quoting type, as explained in connection with FIG. 2. After the step 1220, processing proceeds to a step 1225, where the author extracts a required quote from a referenced video (different types of quotes are explained in FIGS. 2, 3A-3E). After the step 1225, processing proceeds to a step 1227, where the author chooses a construction type for a derivative episode associated with the referenced video (different types of derivative episodes are also explained in FIGS. 3A-3E). After the step 1227, processing proceeds to a step 1230, where the author builds a derivative episode from the quote extracted from the referenced video and adds the derivative episode to the newly recorded video. After the step 1230, processing proceeds to a test step 1232, where it is determined whether the just added derivative episode has been chosen from the last referenced video in the process of recording of the new video. If not, processing proceeds to the step 1217, which may be independently reached from the test step 1215. Otherwise, processing proceeds to a test step 1250, where it is determined whether the new recording or commenting by the author is complete. If not, processing proceeds to the step 1210; otherwise, processing proceeds to a step 1252, where the new video or a modified video discussion thread is added to the repository.

After the step 1252, processing proceeds to a step 1255, where the automatic process of building affinity sets of viewers and videos is initiated. After the step 1255, processing proceeds to a step 1257, where the system chooses a first viewer set. After the step 1257, processing proceeds to a step 1260, where the system builds a viewership graph for the current viewer set, as explained in connection with FIG. 8. After the step 1260, processing proceeds to a step 1262, where the attraction values corresponding to edges of the viewership graph (viewer attraction values for the watched videos, explained in FIG. 7A) are calculated. After the step 1262, processing proceeds to a step 1265, where edge attraction values are aggregated into the affinity index for the current set of viewers, as explained in FIG. 8 and the accompanying text. After the step 1265, processing proceeds to a test step 1270, where it is determined whether the value of the affinity index calculated in the step 1265 improves the runtime optimal range of affinity indexes obtained for the previous viewer set (see discussion on value ranges for the affinity index at the end of accompanying text for FIG. 8). If the current value of the affinity index improves the runtime optimal range, processing proceeds to a step 1272, where the runtime optimal range and the current collection of affinity groups are updated. After the step 1272, processing proceeds to a test step 1275, where it is determined whether the current viewer set is the last viewer set to be chosen (note that the test step 1275 may be independently reached from the test step 1270 if it is determined that the current affinity index calculated at the step 1265 does not improve the runtime optimal range of affinity indexes). If it is determined at the test step 1275 that the last viewer set has been chosen, processing proceeds to a step 1280, where the system builds subsets of most attractive videos (MAVS) for the chosen affinity groups (see FIG. 8 for details).

After the step 1280, processing proceeds to a step 1282, where MAVS are presented to a new user for ranking, as explained elsewhere herein (see FIG. 9 and the accompanying text). After the step 1282, processing proceeds to a step 1285, where the ranking of MAVS by the new user is processed, as explained in conjunction with FIG. 9. After the step 1285, processing proceeds to a step 1287, where an affinity group (or multiple groups) is/are associated with the new user based on processing user ranking of MAVS (see the accompanying text for FIG. 9). After the step 1287, processing proceeds to a step 1290, where the associated affinity groups are applied to enhanced video search, as explained elsewhere herein (see, for example, FIG. 10 and the accompanying text). After the step 1290, processing proceeds to a step 1295, where the associated affinity groups are applied to the enhanced video recommendation process, as explained in conjunction with FIG. 11. After the step 1295, processing is complete.

If it is determined at the test step 1275 that the last viewer set in the process of optimization of the affinity groups has not been chosen, processing proceeds to a step 1277, where the next viewer set is chosen. After the step 1275, processing proceeds to the step 1260, which may be independently reached from the step 1257.

If it is determined at the test step 1215 that the currently recorded video is not a referencing video, processing proceeds to a test step 1235, where it is determined whether the author is commenting on another video from the video repository (which may have any type: the video may be an original video, a referencing video, or another video discussion thread, which is being continued by the author). If the author is not commenting on another video from the video repository, processing proceeds to the test step 1250, which may be independently reached from the test step 1232; otherwise, processing proceeds to a step 1237, where the current author chooses an original video, a referencing video, or a video discussion thread from the video repository. After the step 1237, processing proceeds to an optional step 1240, where the author chooses the quote type and extracts a quote from a video, chosen at the step 1237, for the commenting purpose. After the step 1240, processing proceeds to a step 1242, where the author chooses a construction type for the comment (such as the format of a derivative episode explained in FIGS. 3A-3E). After the step 1242, processing proceeds to a step 1245, where the author builds and enters a comment to the video chosen at the step 1237. After the step 1245, processing proceeds to a test step 1247, where it is determined whether the author has entered a last comment. If not, processing proceeds to the step 1237, which may be independently reached from the test step 1235; otherwise, processing proceeds to the test step 1250, which may be independently reached from the test steps 1232, 1235.

Figure 13:
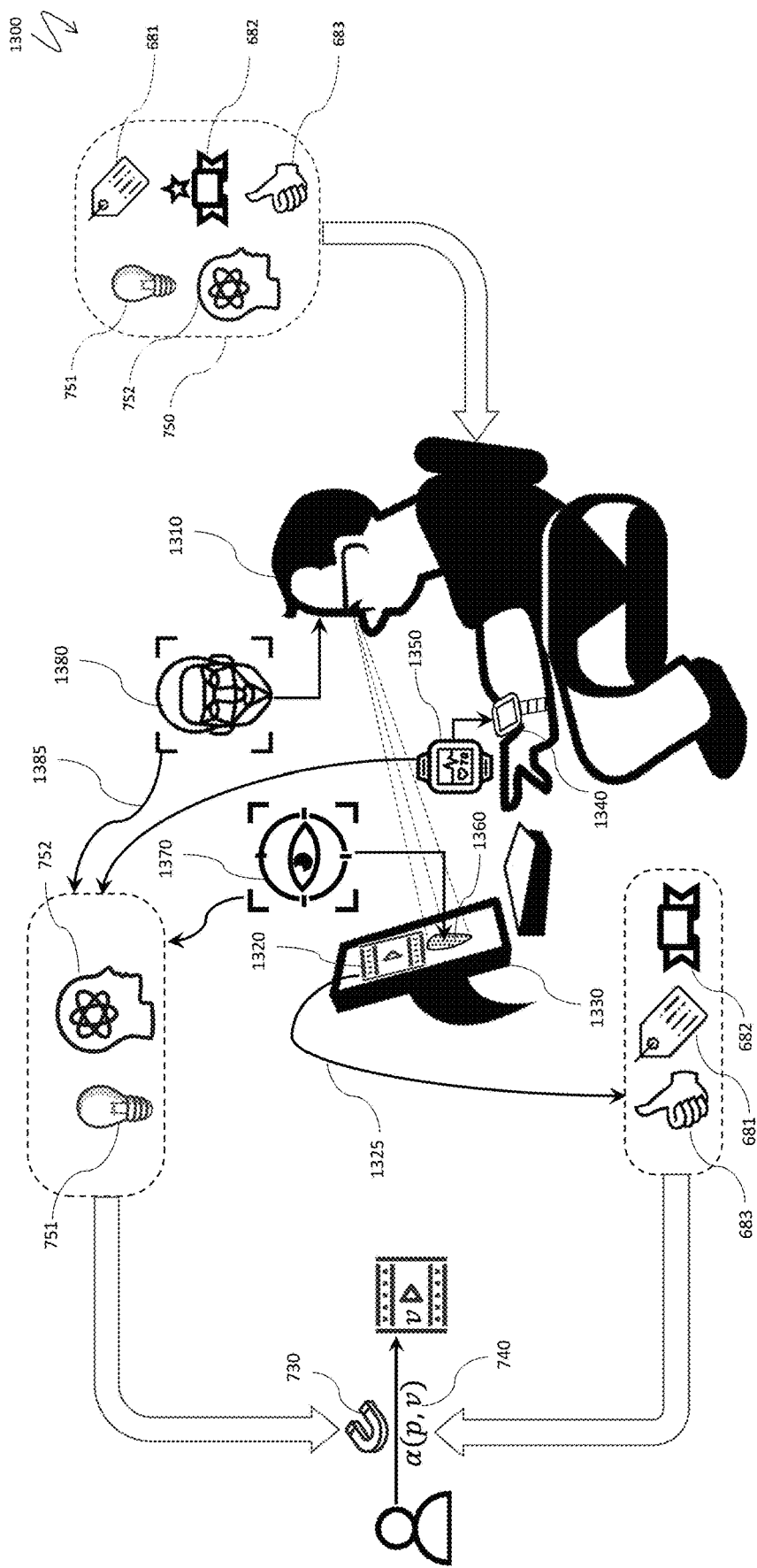
FIG. 13 is a schematic illustration of a technology stack and workflow for assessing user attraction to a video, according to an embodiment of the system described herein.

FIG. 13 is a schematic illustration 1300 of a technology stack and workflow for assessing user attraction to a video. As explained in connection with FIG. 7A, attraction 730 of a viewer to a video may be quantified to provide a value 740, a (p, v), that may be derived from a variety of parameters 750, such as an attention level, a comprehension level 752, presence and nature of feedback of the viewer, such as the viewer tags 681, the recommendations 682, and the reactions (assessments) 683, representing some attributes of the video repository 110. FIG. 13 explains the additional technology and workflow employed for assessing attractiveness of a video to a viewer.

A viewer 1310 watches a video 1320 on a device 1330 (a desktop or mobile computer, tablet, smartphone, etc.). A portion of the parameters 750, such as the viewer tags 681, the recommendations 682, and the reactions 683, may be directly measured by an interaction of the viewer 1310 with the video 1320, as shown by an arrow 1325. However, the attention level 751 and the comprehension level 752 of the viewer 1310 may require additional technologies that reflect on the internal psychological state of the viewer 1310. In FIG. 13, the viewer 1310 wears a smart watch 1340 that includes technology 1350 for measuring vital signs of the viewer 1310, such as a heart rate and other characteristic of the pulse that correlate with an emotional state and a psychological state of the viewer 1310. Other wearable devices may be used instead of the smart watch 1340. Additionally, the system may perform eye-tracking and measure gaze direction and viewer concentration on different materials of content of the video 1320 using gaze detection technology 1370, and further identify user emotional and psychological state employing facial recognition technology 1380 to detect facial expressions that reflect particular emotional and psychological states of the viewer 1310. The combined assessment of user condition with the technology stack (represented in FIG. 13 by the technologies 1350, 1370, 1380) using psychometric and sentiment recognition software (not shown in FIG. 13) may estimate the levels of user attention 751 and comprehension 752, as illustrated by arrows 1385.

Bringing together the two groups of parameters, assessed by different mechanisms (the viewer tags 681, the recommendations 682, and the reactions 683 assessed directly by analyzing viewer input, and the attention level 751 and the comprehension level 752 estimated using the additional technology stack and software), the system may aggregate data therefrom into the resulting quantitative estimate 740 of the viewer attraction 730 to a video.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations may vary from the illustrations presented herein. Further, various aspects of the system described herein may be deployed on various devices, including, but not limited to wearable devices, smartphones, tablets and other mobile computers. Mobile devices may use operating system(s) selected from the group consisting of: IOS, Android OS, Windows Phone OS, Blackberry OS and mobile versions of Linux OS. Certain components of the system may be cloud based and interact with mobile computers.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for a particular user to selectively search a video repository, comprising
   measuring, using wearable technology, physiological parameters of a plurality of users of the video repository while the plurality of users watch at least a subset of videos of the video repository;
   determining attraction values of the plurality of users to the at least subset of videos using gaze detection technology and based, at least in part, on at least one of: the physiological parameters and facial recognition technology;
   forming groups of the plurality of users by maximizing an aggregate function applied to all attraction values between users in each of the groups and all of the videos that the users in each of the groups have watched; and
   searching only the subset of videos of the video repository that have been watched by at least one member of a particular group, the particular group corresponding to the particular user, wherein the forming of groups of users that maximize the aggregate of the attraction values for the subset of videos includes constructing a graph that, for all of the users, connects each of the users to each video of the video repository that each of the users has watched and wherein, for all of the users, edges of the graph correspond to the attraction values of the user to each video of the video repository that each of the users has watched.

2. The method of claim 1, wherein the physiological parameters include heart rate and determining the attraction values include measuring at least one of: eye movement, gaze direction, and facial expressions.

3. The method of claim 2, wherein the heart rate is measured using the wearable technology.

4. The method of claim 1, wherein the attraction values also depend on feedback provided by the plurality of users after watching the at least subset of videos.

5. The method of claim 4, wherein the feedback is at least one of user assigned tags, recommendations, or assessments.

6. The method of claim 1, wherein the particular user is a member of the particular group.

7. The method of claim 1, further comprising:
   the particular user obtaining recommendations for videos of the video repository based on recommendations of a subset of members of the particular group.

8. The method of claim 1, wherein the aggregate of attraction values is maximized if every video watched by one of the users of each of the groups has been watched by all of the users from each of the groups.

9. The method of claim 1, wherein the particular user is determined to correspond to the particular group based on the particular user providing high rankings to the at least subset of videos of the video repository rated higher than other videos by members of the particular group.

10. The method of claim 1, wherein the video repository includes original videos, referencing videos, and video discussion threads, wherein the original videos do not refer to other videos, the referencing videos include direct links to other videos in the video repository, and the video discussion threads include comments about the videos in the video repository.

11. The method of claim 10, wherein a portion of one of the videos that is referenced by a referencing video is clipped or extracted and added to the referencing video.

12. The method of claim 10, wherein a portion of one of the videos that is referenced by a referencing video is played unmodified in the referencing video.

13. The method of claim 10, wherein a presenter is immersed into the videos that is referenced by a referencing video.

14. The method of claim 13, wherein the presenter replaces a previous presenter from the videos that is referenced by the referencing video.

15. The method of claim 1, wherein the aggregate function is determined using a formula:

$$\varepsilon(U) = \mathcal{A}(\{(u,v)\} | u \in U, v \in \mathcal{V}(U))$$

where $\varepsilon(U)$ is a numerical representation of the aggregate of attraction values, $\alpha(u, v)$ is a specific attraction value of the user, u, to a particular one of the videos, v, U represents a group of users, $\mathcal{V}(U)$ represents all videos in the video repository that have been viewed by at least one user from the group U, and $\mathcal{A}$ represents the aggregate function.

16. The method of claim 1, wherein the aggregate function is a fuzzy conjunction of attraction values.

17. A non-transitory computer readable medium containing software that selectively searches a video repository for a particular user, the software comprising executable code that measures, using wearable technology, physiological parameters of a plurality of users of the video repository while the plurality of users watch at least a subset of videos of the video repository;

executable code that determines attraction values of the plurality of users to the at least subset of videos using at least one of: the physiological parameters, gaze detection technology, and facial recognition technology;

executable code that forms groups of the plurality of users by maximizing an aggregate function applied to all attraction values between users in each of the groups and all of the videos that the users in each of the groups have watched; and executable code that searches only the subset of videos of the video repository that have been watched by at least one member of a particular group, the particular group corresponding to the particular user, wherein the executable code that forms groups by maximizing the aggregate of the attraction values for the subset of videos constructs a graph that, for all of the users, connects each of the users to each video of the video repository that each of the users has watched and wherein, for all of the users, edges of the graph correspond to the attraction values of the user to each video of the video repository that each of the users has watched.

18. The non-transitory computer readable medium of claim 17, wherein the aggregate function is determined using a formula:

$$\varepsilon(U) = \mathcal{A}(\{\alpha(u,v)\}|u \in U, v \in \mathcal{V}(U))$$

where $\varepsilon(U)$ is a numerical representation of the aggregate of attraction values, $\alpha(u, v)$ is a specific attraction value of the user, u, to a particular one of the videos, v, U represents a group of users, $\mathcal{V}(U)$ represents all videos in the video repository that have been viewed by at least one user from the group U, and $\mathcal{A}$ represents the aggregate function.

19. The non-transitory computer readable medium of claim 17, wherein the aggregate function is a fuzzy conjunction of attraction values.

* * * * *